US012597625B2

(12) United States Patent
Choi et al.

(10) Patent No.: US 12,597,625 B2
(45) Date of Patent: Apr. 7, 2026

(54) POUCH-SHAPED BATTERY CASE SEALING APPARATUS AND POUCH-SHAPED SECONDARY BATTERY SEALING METHOD USING THE SAME

(71) Applicant: LG Energy Solution, Ltd., Seoul (KR)

(72) Inventors: Kwang Hee Choi, Daejeon (KR); Kwan Bo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 729 days.

(21) Appl. No.: 17/918,777

(22) PCT Filed: Dec. 24, 2021

(86) PCT No.: PCT/KR2021/019840
§ 371 (c)(1),
(2) Date: Oct. 13, 2022

(87) PCT Pub. No.: WO2022/145895
PCT Pub. Date: Jul. 7, 2022

(65) Prior Publication Data
US 2023/0148221 A1      May 11, 2023

(30) Foreign Application Priority Data
Dec. 28, 2020    (KR) ........................ 10-2020-0184336

(51) Int. Cl.
*H01M 10/04*      (2006.01)
*H01M 50/105*      (2021.01)
*H01M 50/186*      (2021.01)
(52) U.S. Cl.
CPC ..... *H01M 10/0404* (2013.01); *H01M 50/105* (2021.01); *H01M 50/186* (2021.01)

(58) Field of Classification Search
CPC ........... H01M 10/0404; H01M 50/186; H01M 50/105
See application file for complete search history.

(56) References Cited

U.S. PATENT DOCUMENTS

| | | | |
|---|---|---|---|
| 5,123,227 A | 6/1992 | Shibauchi et al. |
| 7,011,202 B2 | 3/2006 | Farmer et al. |
| 2015/0000117 A1 | 1/2015 | Cho et al. |

FOREIGN PATENT DOCUMENTS

| | | |
|---|---|---|
| JP | 2001278223 A | 10/2001 |
| JP | 2001283799 A | 10/2001 |

(Continued)

OTHER PUBLICATIONS

Extended European Search Report including Written Opinion for Application No. 21915693.2 dated Nov. 6, 2023, pp. 1-8.

(Continued)

*Primary Examiner* — Allison Bourke
*Assistant Examiner* — Kayla Elaine Clary
(74) *Attorney, Agent, or Firm* — Lerner David LLP

(57) ABSTRACT

The present invention relates to a pouch-shaped battery case sealing apparatus capable of adjusting a direction in which an upper sealing block configured to press a laminate sheet applies pressure to the laminate sheet during a process of applying heat and pressure to an outer periphery of a battery case made of the laminate sheet to seal the outer periphery of the battery case when a pouch-shaped battery is manufactured and a pouch-shaped secondary battery sealing method using the same.

10 Claims, 3 Drawing Sheets

(56)     References Cited

FOREIGN PATENT DOCUMENTS

| JP | 2006278263 | A |  | 10/2006 | | |
|----|------------|----|---|---------|---|---|
| KR | 20000065295 | A |  | 11/2000 | | |
| KR | 20070063888 | A |  | 6/2007 | | |
| KR | 101527124 | B1 |  | 6/2015 | | |
| KR | 20160073097 | A |  | 6/2016 | | |
| KR | 101648428 | B1 | * | 9/2016 | ............. | H01M 8/24 |
| KR | 101672402 | B1 |  | 11/2016 | | |
| KR | 101762807 | B1 |  | 7/2017 | | |
| KR | 101816333 | B1 |  | 1/2018 | | |
| KR | 102088214 | B1 |  | 3/2020 | | |
| KR | 20200059392 | A |  | 5/2020 | | |
| KR | 102191499 | B1 |  | 12/2020 | | |

OTHER PUBLICATIONS

International Search Report for Application No. PCT/KR2021/019840 mailed Apr. 6, 2022, 2 pages.

* cited by examiner

【FIG. 1】
<u>50</u>
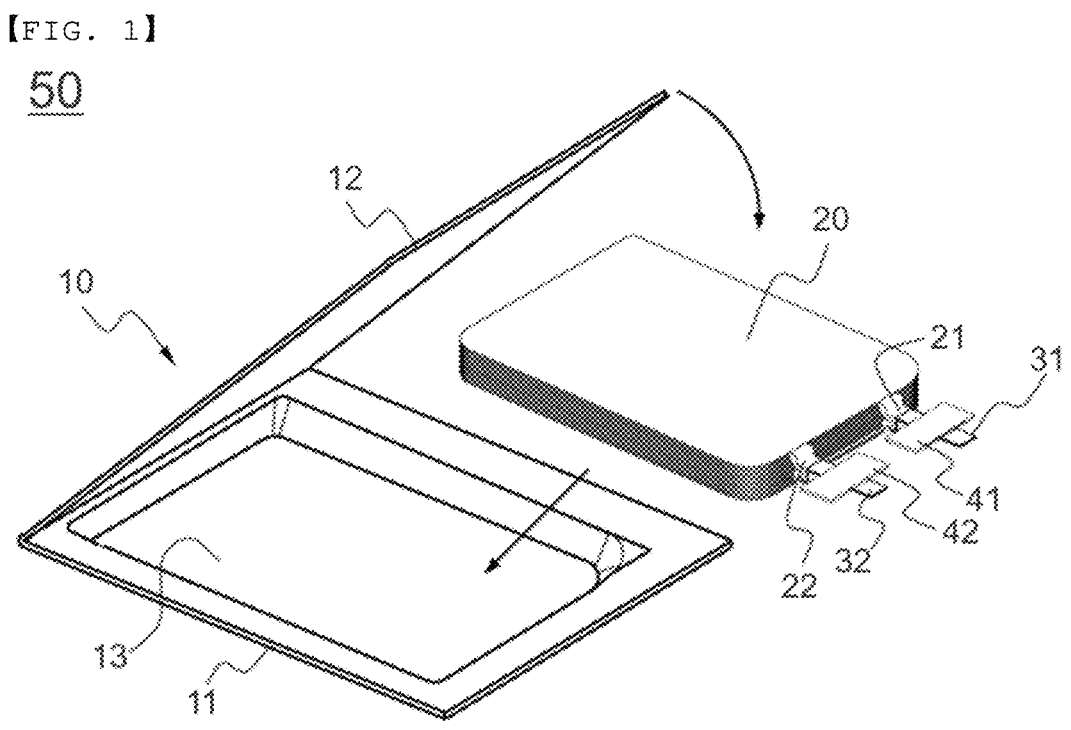
【FIG. 2】
<u>500</u>
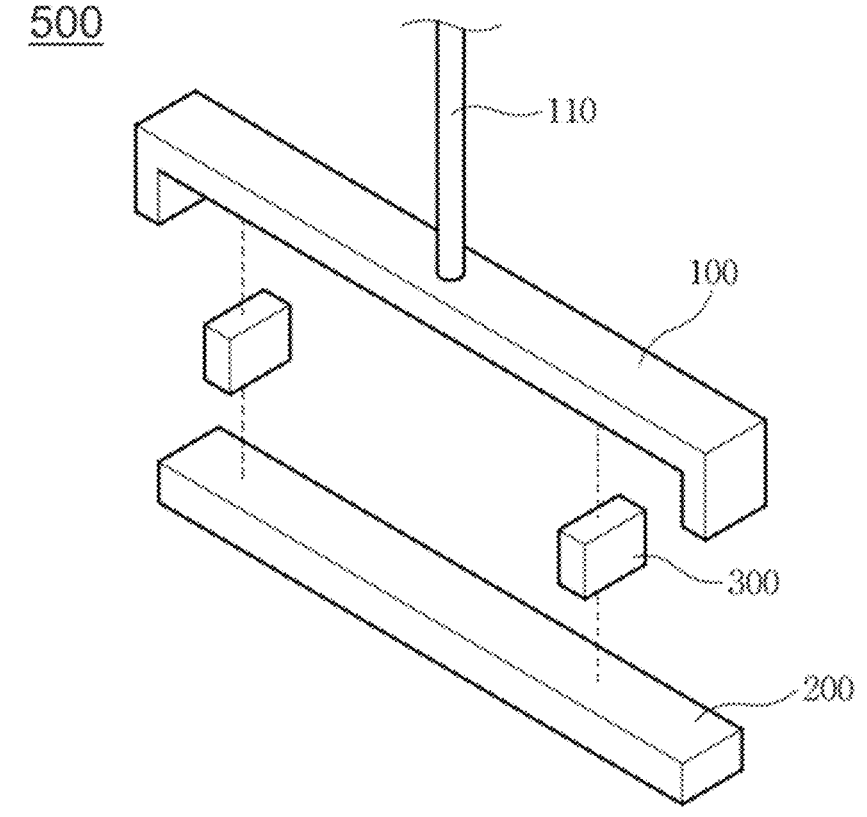

【FIG. 3】
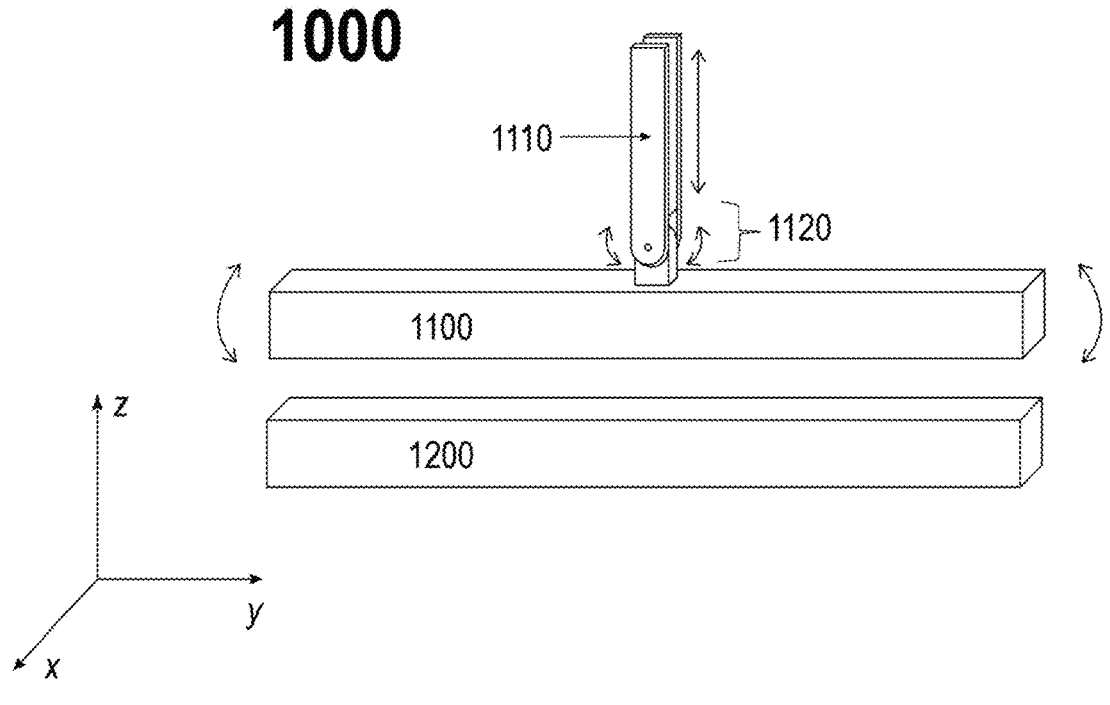
【FIG. 4】
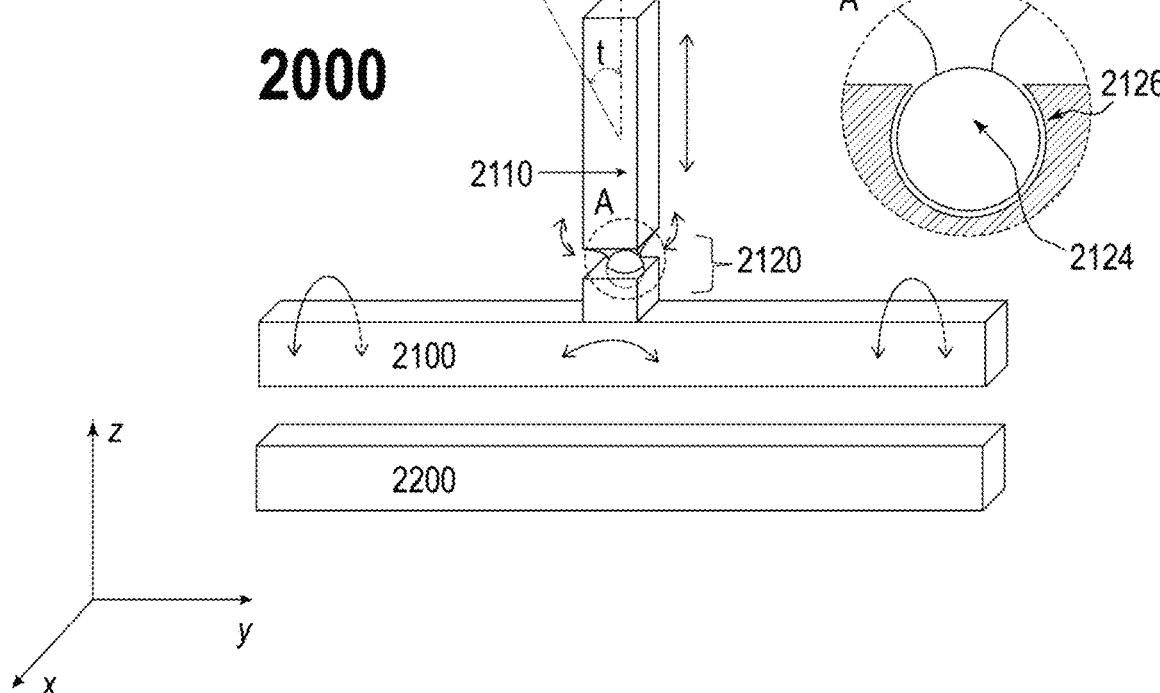

【FIG. 5】
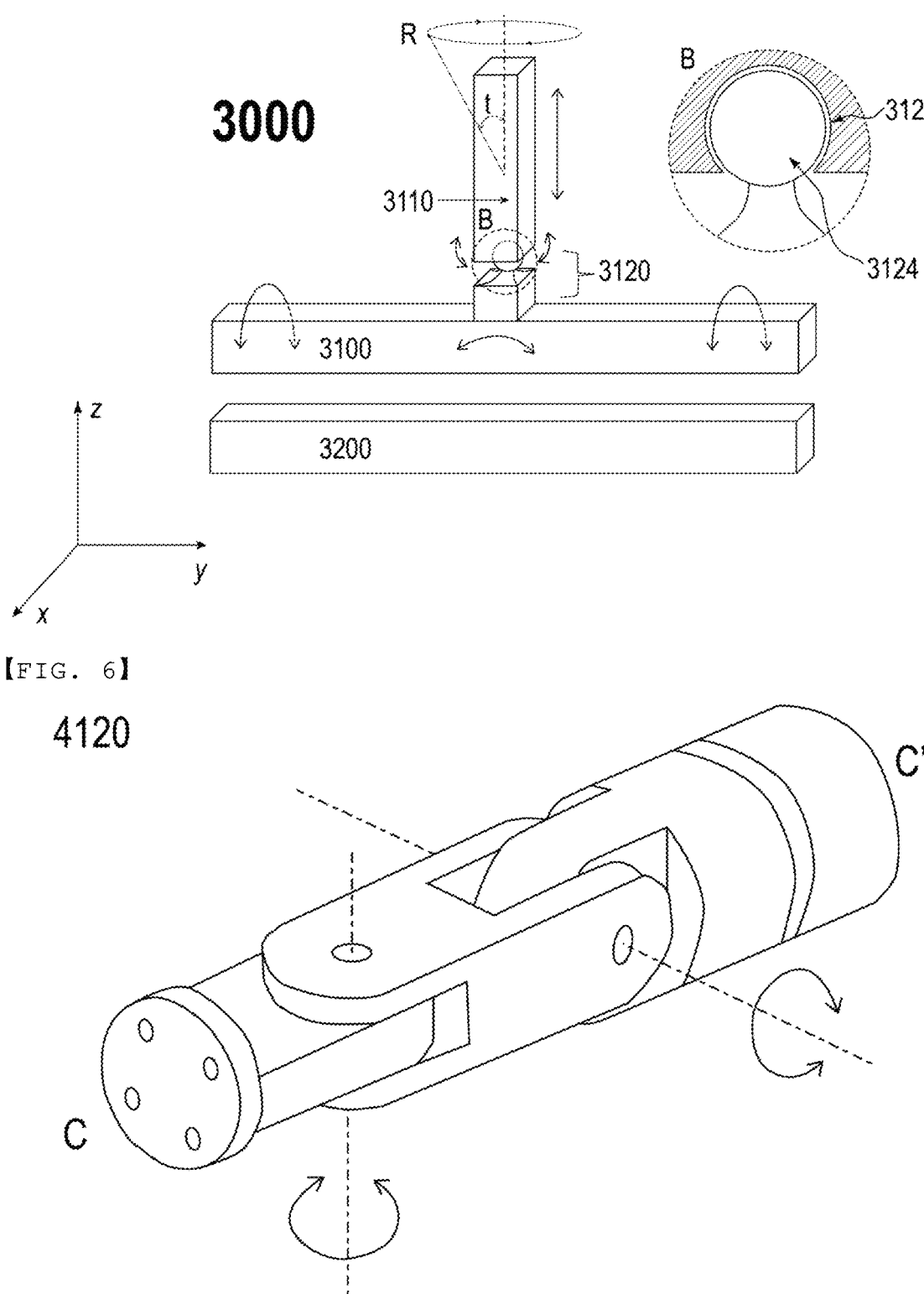
【FIG. 6】

POUCH-SHAPED BATTERY CASE SEALING APPARATUS AND POUCH-SHAPED SECONDARY BATTERY SEALING METHOD USING THE SAME

CROSS-REFERENCE TO RELATED APPLICATIONS

This application is a national stage entry under 35 U.S.C. § 371 of International Application No. PCT/KR2021/019840, filed on Dec. 24, 2021, which claims priority to Korean Patent Application No. 10-2020-0184336 filed on Dec. 28, 2020, the disclosures of which are incorporated herein by reference in their entireties.

TECHNICAL FIELD

The present invention relates to a pouch-shaped battery case sealing apparatus and a pouch-shaped secondary battery sealing method using the same. More particularly, the present invention relates to a pouch-shaped battery case sealing apparatus capable of adjusting a direction in which an upper sealing block configured to press a laminate sheet applies pressure to the laminate sheet during a process of applying heat and pressure to an outer periphery of a battery case made of the laminate sheet to seal the outer periphery of the battery case when a pouch-shaped battery is manufactured and a pouch-shaped secondary battery sealing method using the same.

BACKGROUND ART

Demand for a secondary battery as an energy source for mobile devices, electric vehicles, etc. has abruptly increased. In particular, demand for a lithium secondary battery, which has high energy density and high discharge voltage, is high.

Based on the shape and material thereof, the lithium secondary battery may be classified as a cylindrical secondary battery made of a metal material, a prismatic secondary battery made of a metal material, or a pouch-shaped battery made of a laminate sheet. The pouch-shaped battery has advantages in that the pouch-shaped secondary battery is stacked with high integrity, thereby having high energy density per unit weight, is manufactured at low cost, and is easily deformable. Consequently, the pouch-shaped battery is used in various devices.

In general, a laminate sheet including an outer coating layer, a metal blocking layer, and an inner adhesive layer is shaped so as to be used as a battery case of the pouch-shaped battery. An electrode assembly is received in a receiving portion formed in the laminate sheet together with an electrolytic solution, and the receiving portion is sealed, whereby the pouch-shaped battery is manufactured.

As shown in FIG. 1, a pouch-shaped battery 50 is configured such that an electrode assembly 20 is mounted in a receiving portion 13 of a battery case 10 constituted by a lower pouch-shaped part 11 and an upper pouch-shaped part 12. In the electrode assembly 20, positive and negative electrode tabs 21 and 22 are exposed outside of the battery case 10 in a state of being welded respectively to two electrode leads 31 and 32. An outer periphery of the battery case 10 is sealed in the state in which a pair of insulative films 41 and a pair of insulative films 42 are disposed respectively at an upper part and a lower part of the electrode lead 31 and an upper part and a lower part of the electrode lead 32.

The outer periphery of the battery case 10 is sealed as the result of inner adhesive layers of laminate sheets being thermally melted and pressed by a rectangular parallelepiped sealing tool that is long in a longitudinal direction thereof.

FIG. 2 is an exploded perspective view of a pouch-shaped battery case sealing apparatus 500 according to Patent Document 1. An outer periphery of a pouch-shaped battery is disposed between a holder 100 and a sealing block 200. The holder 100, which is movable upwards and downwards by a lifting means 110, is moved downwards, and the outer periphery of the pouch-shaped battery is heated and fused, whereby the outer periphery of the pouch-shaped battery is sealed. The holder 100 and the lifting means 110 are fixed or are tiltable only in one direction.

Conventionally, the holder 100 and the lifting means 110 are fixed. In recent years, demand for secondary batteries has rapidly increased, and therefore various attempts to reduce process time for each step have been made. Conventionally, the holder 100 fixed to the lifting means 110 sufficiently presses an outer periphery of a laminate sheet to seal the outer periphery of the laminate sheet. An attempt to change the structure of the holder so as to be tiltable in a direction toward the sealing block 200 in order to rapidly and uniformly performing pressing has been made. Since tilting is performed only in one direction, however, a pouch-shaped secondary battery defect rate is not reduced, and yield is also lowered.

Patent Document 1 relates to a battery cell having a welded surplus portion, the battery cell including an electrode assembly having a structure including a positive electrode, a negative electrode, a separator interposed between the positive electrode and the negative electrode; and a battery case having a structure including a sealed surplus portion at which an outer periphery of the battery case is sealed in the state in which the electrode assembly is received in the battery case, wherein the battery case is made of a laminate sheet having a structure in which a first resin layer, a metal layer, and a second resin layer are sequentially stack from the side facing the electrode assembly, the sealed surplus portion is configured to have a structure in which a first sheet portion and a second sheet portion of the laminate sheet that face each other are joined to each other, at least a part of the sealed surplus portion includes a resin layer fusion portion formed by the first resin layer of the first sheet portion and the first resin layer of the second sheet portion and a metal layer weld portion formed by an end of the metal layer of the first sheet portion and an end of the metal layer of the second sheet portion.

Patent Document 1 discloses that first and second sealing tools are disposed above and under the sheet portion and that the sealing tools are rotated so as to be inclined by a predetermined angle; however, the sealing tools are configured to be tilted only in one direction, as mentioned above. Furthermore, Patent Document 1 discloses a means configured to further press a part of the portion to be sealed, not the entire portion to be sealed, which cannot become a solution for uniformly sealing the entire portion to be sealed, which is achieved by the present invention.

Patent Document 2 relates to a sealing apparatus used to seal a secondary battery packaging material, the sealing apparatus including a first sealing tool, a second sealing tool configured to perform sealing while facing the first sealing tool, a first pulling unit attached to an end of the first sealing tool, and a second pulling unit attached to an end of the second sealing tool so as to correspond to the first pulling unit, wherein, in a sealing process, the first pulling unit pulls the end of the first sealing tool in a direction toward the second sealing tool, and the second pulling unit pulls the end of the second sealing tool in a direction toward the first sealing tool.

Patent Document 3 relates to an apparatus for bending a sealed surplus portion formed at an outer periphery of an electrode assembly receiving portion of a battery cell in a direction toward the electrode assembly receiving portion, the apparatus including a cell fixing jig to which the battery cell is mounted in the state in which an outer end of the sealed surplus portion protrudes outwards from an outer side of the jig; a guide member configured to press an inner end of the sealed surplus portion that abuts the electrode assembly receiving portion downwards in a first direction perpendicular to the ground to form a bent point; and a bending member configured to press the outer end of the sealed surplus portion upwards while moving in a second direction opposite the first direction such that the outer end of the sealed surplus portion is bent in the second direction based on the bent point; wherein, in the state in which the outer end of the sealed surplus portion is bent in the second direction, the guide member returns to the position thereof before pressing, and the bending member is rotated in a third direction perpendicular to the first direction and the second direction to further bend the outer end of the sealed surplus portion in the third direction.

Patent Document 4 relates to a power storage device and a package structure thereof, wherein a power storage device cell configured such that bottoms of electrode terminals 4 and 5 are fixed to an adaptor 10 is received in two frames 21, which are coupled to each other, the adapter 10 is pressed and held by the frames 21, a power storage unit 2 is floated with respect to the frames 21 using the adaptor 10 as a supporting point, whereby the power storage device cell is positioned by the frames 21, and therefore it is possible to easily handle the power storage device cell.

Patent Documents 2 to 4 do not disclose a construction for freely moving the sealing tool, and therefore do not recognize a problem to be solved by the present invention.

In sealing of a pouch-shaped battery recognized by the present invention as an important problem, as described above, technology capable of uniformly sealing a surface to be sealed within a short time, thereby improving sealing efficiency, has not yet been proposed.

(Patent Document 1) Korean Patent Application Publication No. 2016-0073097 (2016 Jun. 24) ("Patent Document 1")
(Patent Document 2) Korean Registered Patent Publication No. 1816333 (2018 Jan. 2) ("Patent Document 2")
(Patent Document 3) Korean Registered Patent Publication No. 2088214 (2020 Mar. 6) ("Patent Document 3")
(Patent Document 4) Japanese Patent Application Publication No. 2006-278263 (2006 Oct. 12) ("Patent Document 4")

DISCLOSURE

Technical Problem

The present invention has been made in view of the above problems, and it is an object of the present invention to provide a pouch-shaped battery case sealing apparatus capable of uniformly sealing a portion to be sealed of an outer periphery of a pouch-shaped secondary battery, thereby improving sealing efficiency while reducing sealing time, and a pouch-shaped secondary battery sealing method using the same.

Technical Solution

In order to accomplish the above object, the present invention provides a pouch-shaped battery case sealing apparatus including an upper sealing block and a lower sealing block, wherein a surface to be sealed of the pouch-shaped battery case is disposed in an X-Y plane, the upper sealing block and the lower sealing block are disposed in parallel to a Y-axis, the upper sealing block is fixed to a fixing shaft configured to move upwards and downwards in a Z-axis direction so as to be moved upwards and downwards in a Z-axis direction, and the upper sealing block and the fixing shaft are coupled to each other via a hip joint type coupling unit.

The coupling unit may be disposed at the middle of the upper sealing block, and the upper sealing block may perform tilting motion with respect to the X-Y plane about the Z-axis. Meanwhile, a guide configured to prevent rotational motion of the upper sealing block about the Z-axis may be formed in the vicinity of the upper sealing block.

The coupling unit may include a first insertion portion extending from the fixing shaft, the distal end of the first insertion portion being spherical, and a first support portion fixed to the upper sealing block, the first insertion portion being inserted into and fixed to the first support portion.

The coupling unit may include a second insertion portion extending from the upper sealing block, the distal end of the second insertion portion being spherical; and a second support portion disposed at the distal end of the fixing shaft, the second insertion portion being inserted into and fixed to the second support portion.

The fixing shaft may move about the coupling portion in the form of precession with respect to the Z-axis.

The hip joint type coupling portion may be replaced with a coupling portion having two or more joints.

In another aspect, the present invention provides a method of sealing a pouch-shaped battery using the pouch-shaped battery case sealing apparatus.

In a further aspect, the present invention provides a pouch-shaped battery sealed using the pouch-shaped battery case sealing apparatus.

In addition, the present invention may provide all possible combinations of the above solving means.

Advantageous Effects

As is apparent from the above description, the present invention may provide a pouch-shaped battery case sealing apparatus capable of uniformly sealing a portion to be sealed of an outer periphery of a pouch-shaped secondary battery, thereby improving sealing efficiency while reducing sealing time, and a pouch-shaped secondary battery sealing method using the same.

The sealing apparatus according to the present invention is capable of securing a uniformly sealed surface within a short time while reducing a sealing defect rate.

DESCRIPTION OF DRAWINGS

FIG. 1 is an exploded perspective view of a conventional pouch-shaped battery.

FIG. 2 is an exploded perspective view of a pouch-shaped battery case sealing apparatus according to Patent Document 1.

FIG. 3 is a schematic view of a conventional pouch-shaped battery case sealing apparatus configured to perform tilting motion about only one axis.

FIG. 4 is a schematic view of a pouch-shaped battery case sealing apparatus according to a first embodiment of the present invention.

FIG. 5 is a schematic view of a pouch-shaped battery case sealing apparatus according to a second embodiment of the present invention.

FIG. 6 shows another example of a coupling unit.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 3 is a schematic view of a conventional pouch-shaped battery case sealing apparatus 1000 configured to perform tilting motion about only one axis.

The pouch-shaped battery case sealing apparatus 1000 includes an upper sealing block 1100 and a lower sealing block 1200. In a pouch-shaped battery case sealing apparatus 2000 or 3000 according to the present invention as well as the conventional pouch-shaped battery case sealing apparatus 1000, an outer periphery of a pouch-shaped battery case to be sealed is located between the upper sealing block 1100, 2100, or 3100 and the lower sealing block 1200, 2200, or 3200, in the same manner.

In addition, a surface to be sealed of the pouch-shaped battery case is disposed in an X-Y plane, the upper sealing block 1100, 2100, or 3100 and the lower sealing block 1200, 2200, or 3200 are disposed in parallel to a Y-axis, the upper sealing block 1100, 2100, or 3100 is fixed to a fixing shaft 1110, 2110, or 3110 configured to move upwards and downwards in a Z-axis direction so as to be moved upwards and downwards in a Z-axis direction, and the upper sealing block 1100, 2100, or 3100 and the fixing shaft 1110, 2110, or 3110 are coupled to each other via a coupling unit 1120, 2120, or 3120.

In the conventional pouch-shaped battery case sealing apparatus 1000, the coupling unit 1120 is configured to perform one-axis coupling. Consequently, the upper sealing block 1100 performs only rotational motion in a plane parallel to a Y-Z plane about the center of the coupling unit 1120. The rotational motion may also be referred to as spin motion about an X-axis.

In contrast, in the pouch-shaped battery case sealing apparatus 2000 or 3000 according to the first embodiment or the second embodiment of the present invention, coupling is achieved through a hip joint type coupling unit 2120 or 3120.

The coupling unit 2120 or 3120 may be disposed at the middle of the upper sealing block 2100 or 3100, and the upper sealing block 2100 or 3100 may perform tilting motion with respect to the X-Y plane about the Z-axis, specifically about the coupling unit 2120 or 3120. Rotational motion about the Z-axis is not desirable while the tilting motion is performed. Consequently, a guide (not shown) may be formed in the vicinity of the upper sealing block 2100 or 3100 in order to prevent rotational motion of the upper sealing block about the Z-axis.

The upper sealing block 2100 or 3100 may perform spin motion about the X-axis and spin motion about the Y-axis. Consequently, the pouch-shaped battery case sealing apparatus according to the present invention is capable of more efficiently performing sealing than the conventional apparatuses 500 and 1000, whereby it is possible to reduce process time.

The coupling unit 2120 may include a first insertion portion 2124 extending from the fixing shaft 2110, the distal end of the first insertion portion being spherical; and a first support portion 2126 fixed to the upper sealing block 2100, the first insertion portion 2124 being inserted into and fixed to the first support portion. In FIG. 4, A is an enlarged view of the first insertion portion 2124 and the first support portion 2126. The first insertion portion 2124 and the first support portion 2126 may be coupled to each other by interference fitting, and a separate lubricant may be added therebetween.

The coupling unit 3120 may include a second insertion portion 3124 extending from the upper sealing block 3100, the distal end of the second insertion portion being spherical; and a second support portion 3126 disposed at the distal end of the fixing shaft 3110, the second insertion portion 3124 being inserted into and fixed to the second support portion. In FIG. 5, B is an enlarged view of the second insertion portion 3124 and the second support portion 3126. The second insertion portion 3124 and the second support portion 3126 may be coupled to each other by interference fitting, and a separate lubricant may be added therebetween.

Meanwhile, the fixing shaft 2110 or 3110 may move about the coupling portion 2120 or 3120 in the form of precession with respect to the Z-axis. This motion is performed in order to further press the upper sealing block 2100 or 3100 in a direction tilted from the lower sealing block 2200 or 3200. On the assumption that the central axis of the fixing shaft 2110 or 3110 when inclined from the Z-axis by an angle t for precession is R, R may perform precession along an upper circle. Upward and downward movement, tilting, and precession related to driving of an upper end of the fixing shaft 2110 or 3110 are not specifically defined, and are not shown in the figure. This construction may be selected by those skilled in the art as needed.

Also, in the present invention, the hip joint type coupling portion 2120 or 3120 may be replaced with a coupling portion 4120 having two or more joints. A representative example of the coupling portion having two or more joints is shown in FIG. 6. In FIG. 6, C and C' are portions respectively coupled to the upper sealing block and the fixing shaft or to the fixing shaft and the upper sealing block.

In another aspect, the present invention provides a method of sealing a pouch-shaped battery using the pouch-shaped battery case sealing apparatus. In a further aspect, the present invention provides a pouch-shaped battery sealed using the pouch-shaped battery case sealing apparatus.

Those skilled in the art to which the present invention pertains will appreciate that various applications and modifications are possible within the category of the present invention based on the above description.

DESCRIPTION OF REFERENCE SYMBOLS

10: Battery case
11: Lower part
12: Upper part
13: Receiving portion
20: Electrode assembly
21, 22: Electrode tabs
31, 32: Electrode leads
41, 42: Insulative films
50: Pouch-shaped battery
100: Holder
110: Lifting means
200: Sealing block
300: Spacing member
500: Conventional pouch-shaped battery case sealing apparatus
1000: Conventional pouch-shaped battery case sealing apparatus
2000: Pouch-shaped battery case sealing apparatus according to first embodiment of present invention
3000: Pouch-shaped battery case sealing apparatus according to second embodiment of present invention
1100, 2100, 3100: Upper sealing blocks
1200, 2200, 3200: Lower sealing blocks
1110, 2110, 3110: Fixing shafts
1120, 2120, 3120, 4120: Coupling units
2124, 3124: First insertion portion, Second insertion portion
2126, 3126: First support portion, Second support portion
R: Central axis of fixing shaft when inclined from Z-axis by angle t for precession
A, B: Enlarged views of coupling unit

INDUSTRIAL APPLICABILITY

The present invention relates to a pouch-shaped battery case sealing apparatus capable of adjusting a direction in which an upper sealing block configured to press a laminate sheet applies pressure to the laminate sheet during a process of applying heat and pressure to an outer periphery of a battery case made of the laminate sheet to seal the outer periphery of the battery case when a pouch-shaped battery is manufactured and a pouch-shaped secondary battery sealing method using the same, and therefore the present invention has industrial applicability.

The invention claimed is:

1. A pouch-shaped battery case sealing apparatus, comprising: an upper sealing block and a lower sealing block together configured to seal a surface of a pouch-shaped battery case, wherein the surface of the pouch-shaped battery case defines an X-Y plane extending along both an X-axis and a Y-axis, the upper sealing block and the lower sealing block each configured to be disposed parallel to the Y-axis in an initial orientation, the upper sealing block is pivotably coupled to a fixing shaft configured to move upwards and downwards along a Z-axis perpendicular to the X-Y plane, and the upper sealing block and the fixing shaft are pivotably coupled to each other via a hip joint type coupling unit wherein the coupling unit is configured to perform spin motion about the X-axis and/or spin motion about the Y-axis.

2. The pouch-shaped battery case sealing apparatus according to claim 1, wherein the coupling unit is disposed at a middle of the upper sealing block.

3. The pouch-shaped battery case sealing apparatus according to claim 1, wherein the upper sealing block is configured to tilt with respect to the X-Y plane about the X-axis and about the Y-axis.

4. The pouch-shaped battery case sealing apparatus according to claim 1, wherein the coupling unit has a guide configured to prevent rotational motion of the upper sealing block about the Z-axis.

5. The pouch-shaped battery case sealing apparatus according to claim 1, wherein the coupling unit comprises:
an insertion portion extending from the fixing shaft, a distal end of the insertion portion being spherical; and
a support portion fixed to the upper sealing block, the insertion portion being inserted into a recess extending into the support portion.

6. The pouch-shaped battery case sealing apparatus according to claim 1, wherein the coupling unit comprises:
an insertion portion extending from the upper sealing block, a distal end of the insertion portion being spherical; and
a support portion disposed at a distal end of the fixing shaft, the insertion portion being inserted into a recess extending into the support portion.

7. The pouch-shaped battery case sealing apparatus according to claim 1, wherein the fixing shaft is configured to move the coupling unit in a form of precession with respect to the Z-axis.

8. The pouch-shaped battery case sealing apparatus according to claim 1, wherein the coupling unit has two or more joints each configured to pivot the upper sealing block about a single respective rotational axis.

9. The pouch-shaped battery case sealing apparatus according to claim 1, wherein the coupling unit is a hip joint type coupling unit.

10. A method of sealing a pouch-shaped battery using the pouch-shaped battery case sealing apparatus according to claim 1.

* * * * *